Figure 1:
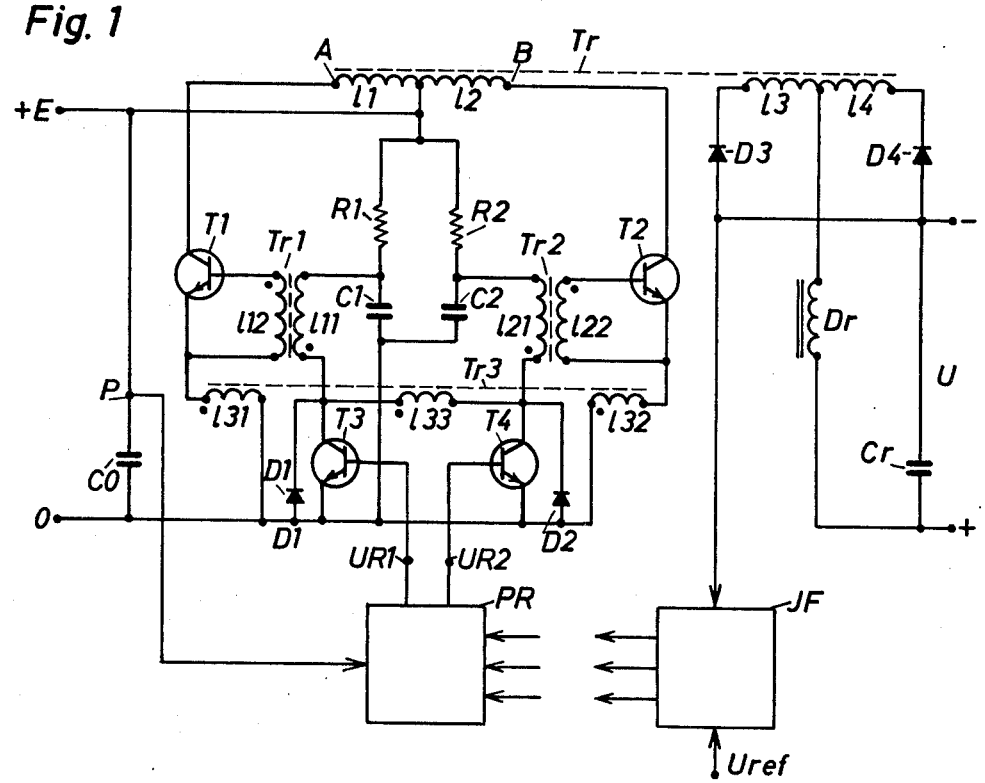

United States Patent

Assow et al.

[11] 4,017,783
[45] Apr. 12, 1977

[54] POWER TRANSISTOR DRIVE APPARATUS IN A DC-CONVERTER

[75] Inventors: Bengt Holger Assow; Kjell Ove Rolleberg, both of Norsborg, Sweden

[73] Assignee: Telefonaktiebolaget L M Ericsson, Stockholm, Sweden

[22] Filed: May 5, 1976

[21] Appl. No.: 683,681

[30] Foreign Application Priority Data

May 22, 1975 Sweden .................................. 7505828

[52] U.S. Cl. ................................ 321/2; 321/45 R
[51] Int. Cl.$^2$ .................................... H02M 3/335
[58] Field of Search ....................... 321/2, 18, 45 R

[56] References Cited

UNITED STATES PATENTS

| | | | |
|---|---|---|---|
| 2,848,614 | 8/1958 | Lyons | 321/2 X |
| 3,219,907 | 11/1965 | Josephson | 321/45 R X |
| 3,374,415 | 3/1968 | Jewett et al. | 321/45 R X |
| 3,875,483 | 4/1975 | Farr | 321/45 R X |
| 3,958,169 | 5/1976 | Hergenhan | 321/11 |

Primary Examiner—William M. Shoop
Attorney, Agent, or Firm—Hane, Sullivan & Spiecens

[57] ABSTRACT

A current drive apparatus in a DC-converter including a pair of alternately conducting power transistors. The drive apparatus includes two drive transistors and a first and second drive transformer. The primary winding of the two transformers is connected via a drive transistor to one terminal of the DC-source and the secondary winding is connected to the control circuit of each power transistor. A further transformer, not being magnetically coupled to the two drive transformers, has two windings connected to the main current path of the power transistors and a further winding connected to one end of the primary windings of the drive transformer in order to couple a fraction of the current through a conducting power transistor to the control circuit of the same transistor. A capacitor is connected across each of said primary windings and each of said drive transistors to provide additional blocking voltage to the non-conducting power transistor.

4 Claims, 10 Drawing Figures

POWER TRANSISTOR DRIVE APPARATUS IN A DC-CONVERTER

The present invention relates to a power transistor drive apparatus in a DC-converter of the kind which is mentioned in the introduction of claim 1.

A converter of said kind includes as known two controllable electronic switching elements in the form of power transistors, the collector electrodes of which are connected to the two end terminals of the primary winding of a main transformer, the center tap of which is connected to one of the terminals of a supply voltage source. The emitter electrodes are connected to the second terminal of the supply voltage source which suitably is placed on reference potential (earth). By alternately controlling the power transistors from conducting to non-conducting state, a rectangular voltage is obtained across the primary winding of the transformer which on the secondary side of the converter is full-wave rectified and smoothed in a smoothing filter. The output voltage thus obtained from the converter is compared with a constant reference voltage and, in dependence on the difference in the level of the output voltage from the converter relatively the level of the reference voltage, the pulse width of the rectangular wave voltage appearing across the primary winding of the converter transformer is varied while its period is kept constant. An example of such a known converter is shown in the Swedish Pat. No. 347 589.

When a converter of the above mentioned kind is to deliver a high out power (in the magnitude of 200 W) it is necessary that each of the power transistors can be controlled so that they are rapidly transferred from their blocked state to their conducting state and vice versa in order to reduce the losses and obtain a high efficiency of the converter.

To obtain high efficiency of the converter it is further required that the drive circuits of the power transistors do not consume higher drive current than necessary when switching from blocked to conducting state. Furthermore, the converter must not be driven with full pulse width, since the risk may occur that both power transistors are conducting at the same time ("shoot-thru").

The object of the present invention is to provide a drive circuit for the power transistors in a DC-converter which, in dependence on a control signal, make these effectively conducting and blocked without being conducting simultaneously and, in addition, generates a drive current which is proportional to the collector current of the power transistor.

The invention, the characteristics of which appear in the appended claims, will be described more fully with reference to the accompanying drawings.

Figure 7:
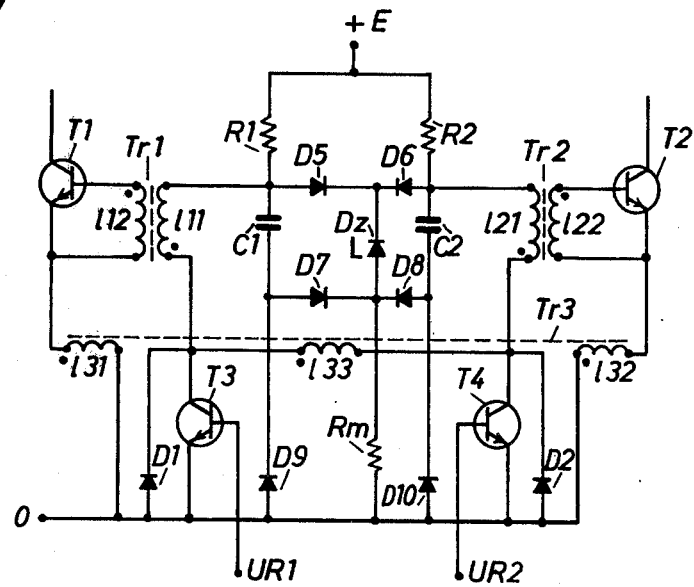
Figure 2:
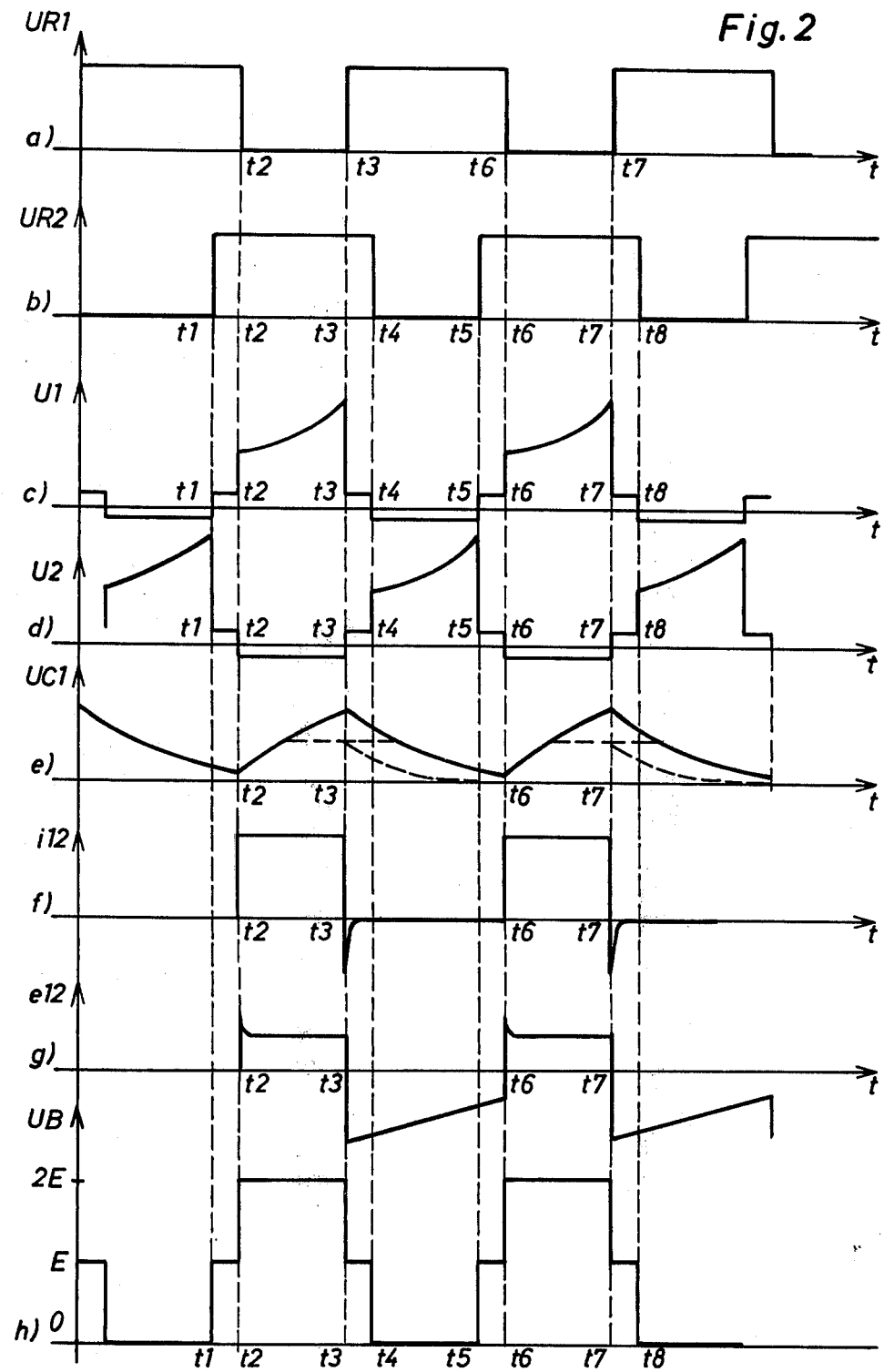

FIG. 1 shows a circuit diagram of a DC-converter containing a drive circuit according to the invention, FIG. 2 shows the wave forms of the different voltages and currents which appear in the converter according to FIG. 1, FIGS. 3–6 show the pulse generating part of the converter according to FIG. 1 to closely illustrate its function within different time intervals at stationary operation, FIG. 7 shows a circuit diagram of a DC-converter according to FIG. 1 in which the drive circuit according to the invention is completed with a limiting circuit and a measuring circuit.

Figure 8:
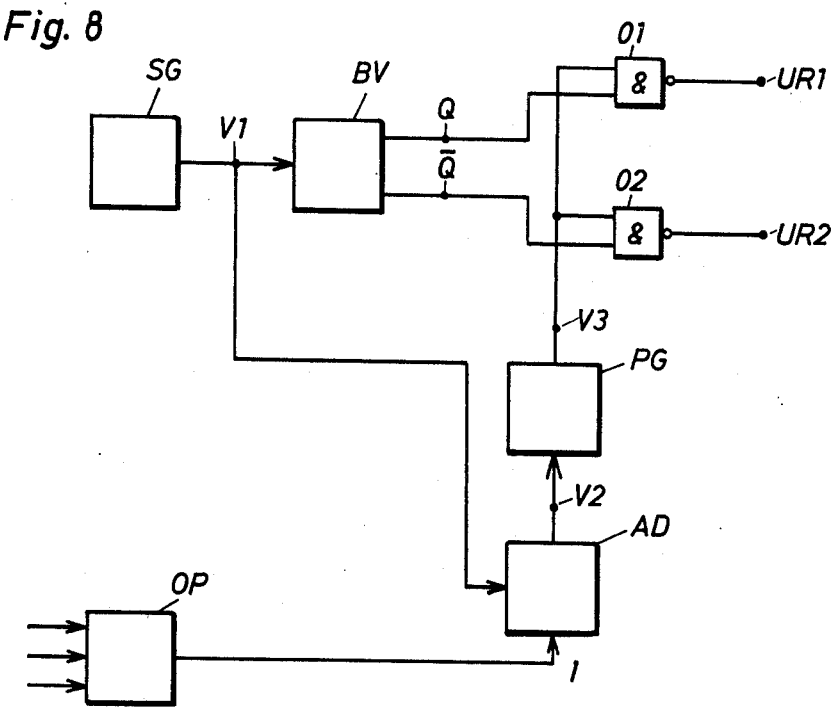
Figure 9:
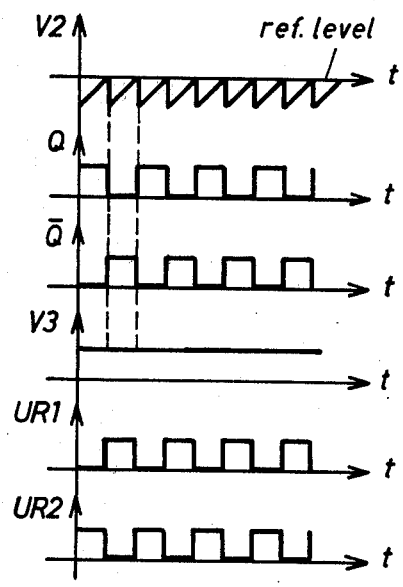
Figure 10:
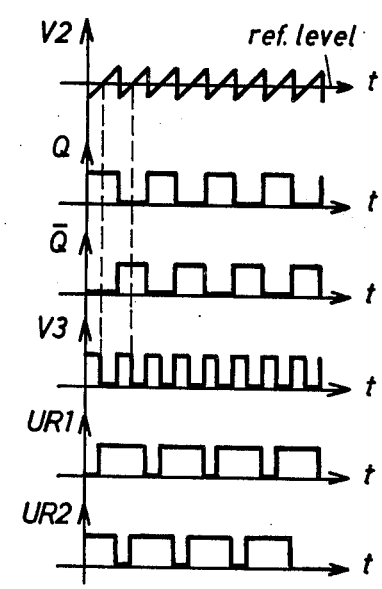

FIG. 8 shows a block diagram of a control circuit in the converter according to FIG. 1, FIGS. 9–10 show wave forms of different voltages which occur in the control circuit according to FIG. 8.

The DC-converter according to FIG. 1 contains two power transistors T1 and T2 of NPN-type which with their collector electrodes are connected to each end terminal of the primary winding halves 11 and 112, respectively, of a main transformer Tr. One terminal +E of a supply voltage source (not shown) is connected to the center tap of the primary winding 11, 12. The capacitor Co is connected between the two terminals of the supply voltage source to reduce the ripple in the rectangular wave voltage appearing across the transformer. The second terminal O of the supply voltage source is earthed. When the converter operates in its normal control mode the control of the power transistors is such that, during a certain time interval, the power transistor T1 is conducting while the transistor T2 is blocked, after which, during the next time interval, both transistors are blocked and, during the subsequent time interval, the transistor T1 is blocked and T2 conducting. To achieve this, a drive circuit according to the invention is provided which contains a first and a second drive transistor T3 and T4, respectively, of NPN-type, which each is connected with its emitter electrode to the terminal O and with its collector electrode to one of the end terminals of the windings 111 and 121, respectively, the second end terminals of which via the resistors R1 and R2 are connected to the terminal +E of the supply voltage source. The windings 111 and 121 each constitute the primary winding of two drive transformers Tr1, Tr2, the secondary windings 112 and 122 of which are connected with their end points to the base emitter circuit of the power transistors T1 and T2, respectively. The polarity of the different windings 111, 112 and 121, 122 is indicated by a dot at the respective winding end in FIG. 1.

The drive circuit according to the invention further contain a common transformer Tr3 with three windings 131, 132 and 133, the polarities of which have been indicated in FIG. 1. The windings 131 and 132 are connected in the emitter path of the power transistor T1 and T2, respectively, and the winding 133 is with both its end points connected to the collector electrodes of the drive transistors T3 and T4. There is no magnetic coupling between the transformer Tr3 and the drive transformers Tr1, Tr2. A capacitor C1, C2 belonging to each drive transformer is coupled to each of the resistors R1 and R2, respectively, and to the terminal O. The winding ratio of the transformers Tr1 and Tr2 relatively the winding ratio of the transformer Tr3 are chosen with respect to the current amplification factor $\beta$ of the power transistors. If, for example, $\beta = 10$, the winding ratio $n31 = n32$ between the windings 133 and 131, 133 and 132 should be choosen 10 times greater than the winding ratio $n12$ of the transformers Tr1, Tr2. If, for example, the transistor T1 conducts a current equal 10 mA, then $n31$ is suitably choosen equal 100 and a current 0,1 mA is obtained through the windings 133, 111. Then $n12 = (1/10) \cdot n31 = 10$ and a current 1 mA is obtained in the base-emitter circuit of the transistor T1 which gives a current of 10 mA through the winding 131.

The secondary winding 13, 14 of the converter main transformer Tr is in known manner connected to a full-wave rectifier consisting of the diodes D3 and D4 which rectifies the rectangular voltage obtained from the primary side. The rectified voltage is smoothed by the choke Dr and the capacitor Cr, a DC voltage U being obtained across the output of the converter.

In order to stabilize the output voltage U, a comparator unit JF is provided which senses the output voltage U and compares this with a constant reference voltage Uref, an error signal being produced, the size of which depends on the difference between the voltages U and Uref. The error signal is supplied, preferably via optical connection, to a control circuit PR at the primary side of the converter. The control circuit PR receives its supply voltage from the terminal +E of the supply voltage source and delivers control pulses with a constant pulse frequency to the drive transistors T3 and T4. These control pulses are illustrated in FIGS. 2a–2b and the duty cycle of the pulses can be varied in dependence on the mangitude of the error signal, whereby the power transistors T1 and T2 can be controlled during a varying time interval within each period of the obtained rectangular voltage. A preferable embodiment of the control circuit PR is shown in FIG. 8 and will be described more in detail below.

When initiating the operation of the converter and when the supply voltage exceeds a certain value (about 5 V), the control circuit PR alternately delivers control pulses to the drive transistors T3 and T4 so that one of these conducts while the other one is blocked. If it is supposed that the drive transistor T3 conducts while the transistor T4 is blocked, then a current will flow from the terminal +E via the resistor R1, the winding 111 and to the terminal O via the conducting transistor T3. In this manner, a certain amount of magnetic energy will be stored in the drive transformer Tr1 and the polarity across the windings 111 and 112 is such that the power transistor T1 is blocked. At the same time, the capacitor C1 is discharged somewhat, since it from the previous period was charged to a certain value. When the transistor T3 is blocked and the transistor T4 starts conducting the voltages across the windings 111 and 112 are reversed so that the power transistor T1 begins to conduct. This results in a current through the winding 131 which, by the magnetic coupling between this winding and the winding 133, gives a current through the winding 111, the capacitor C1 and the conducting diode D2. The current through the winding 131 increases and the base current to the transistor T1 increases at the same time as the charge current to the capacitor C1 increases. A regenerative process is obtained which rapidly causes the transistor T1 to become fully conducting. At the same time, a certain current flows through the resistor R2, the winding 121 and via the conducting transistor T4 to the terminal O. This current results in a voltage drop across the winding 121 and 122 of such polarity that the transistor T2 is blocked. When the drive transistor T3 again conducts, the polarity of the voltages across the windings 121 and 122 is reversed so that the power transistor T2 is blocked. In the same manner as when the transistor T1 was blocked, a charging current flows from the winding 133 through the winding 121, the capacitor C2 and the conducting diode D1. The conduction of the transistor T4 is at the same time counteracted by the polarity of the voltage across the winding 132.

Since the power transistors are alternately conducting and blocked during the start of the converter, a mainly symmetrical rectangular wave voltage is obtained at the point B which assumes the value 0 when the power transistor T2 conducts, the value +E when both transistors T1 and T2 are blocked and the value +2E when the transistor T2 is blocked. In this manner an output voltage U is obtained and the control of the converter is started from a minimum value of the output voltage U, which is compared with the reference voltage Uref. The comparison gives an error signal which, via the optical connection, influences the control circuit PR so that the duty cycle of the control pulses Ur1, UR2 to the drive transistors is changed. The function of the converter in the stationary state, i.e. when full output voltage is obtained, will be described more in detail with reference to the timing diagram according to FIGS. 2a–2h.

FIGS. 2a, 2b illustrate the control pulses UR1, UR2 from the two outputs of the control circuit PR. FIGS. 2c, 2d illustrate the collector-emitter voltages U1, U2 of the drive transistors T3 and T4. FIG. 2e illustrates the voltage UC1 across the capacitor C1. FIG. 2f illustrates the base current $i12$ to the power transistor T1 and FIG. 2g shows it base voltage which is the same as the voltage $e12$ across the winding 112. Finally, FIG. 2h illustrates the rectangular voltage UB which occurs across the point B.

Figure 3:
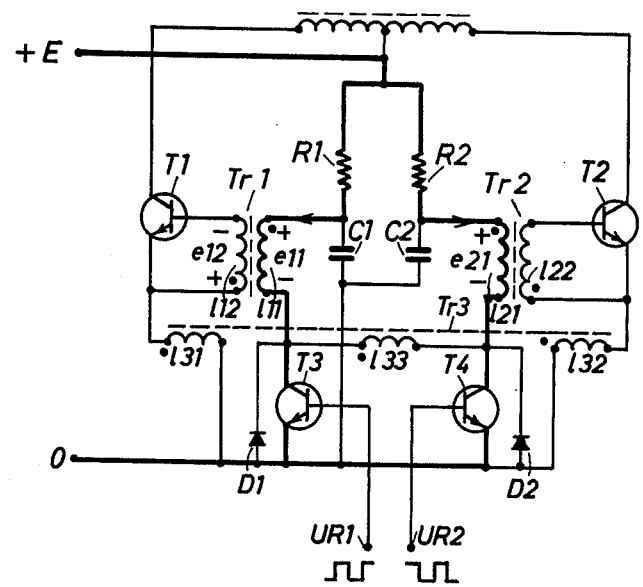

Interval $t1$–$t2$ (FIG. 3)

In this interval the control voltages UR1, UR2 are high and the drive transistors T3, T4 conduct. Then a magnetizing current will flow from the positive terminal +E through the resistors R1, R2, the windings 111, 112 and through the conducting drive transistors T3, T4 back to the earthed terminal O. The drive transformers Tr1, Tr2 will then be magnetized and store a certain energy. The polarity of the induced voltages appearing across the respective transformer windings 111, 112 and 121, 122 are shown in FIG. 3 and it appears that the respective secondary voltage $e12$, $e22$ biases the power transistors T1, T2 so that these are blocked. Consequently, no current flows through the windings 131, 132 of the transformer Tr3 which in this manner becomes completely without current. The winding 133 of the transformer Tr3 will be short-circuited by the conducting transistors T3, T4.

Figure 4:
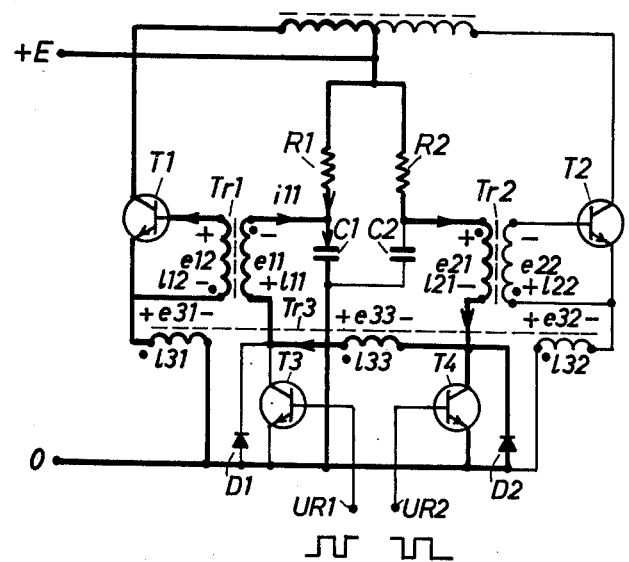

Interval $t2$–$t3$ (FIG. 4)

At the time $t2$ the control pulse UR1 of the drive transistor T3 ceases and this is blocked. Charge current to the capacitor C1 will flow from the terminal +E via the resistor R1 to the terminal O. Consequently, the capacitor C1 will be charged during the whole time interval $t2$–$t3$ if no charging limit is provided. Since the current through the winding 111 of the transformer Tr1 has ceased, an induced emf $e12$ in the winding 112 will appear, having the opposite polarity relatively the emf which appeared when the transistor T3 was conducting (interval $t1$–$t2$). This induced emf $e12$ appears as a positive base voltage for the transistor T1 and this starts conducting at the time $t2$. This implies that current will flow through the winding 131 and give rise to an induced emf $e31$, the polarity of which appears from FIG. 4. This gives an induced emf $e33$ in the winding 133 of the transformer Tr3, the polarity of which appears from FIG. 4. The voltage $e33$ endeavours to give a load current $i11$ with the direction indicated in FIG. 4. The current $i11$ gives in the winding 111 rise to an emf $e11$ with the polarity indicated in the Figure which endeavours to give an increasing emf $e12$ at the secondary side of the transformer Tr1. Consequently, the current in the base circuit of the power transistor T1 will increase which makes this transistor more conducting. In this manner a regenerative process is obtained which achieves that the transistor T1 rapidly becomes fully conducting and the magnitude of its base current will be adapted to the magnitude of its collector-emitter current. The current $i11$ is added to the current from the supply voltage terminal +E and contributes to the charge of the capacitor C1 and the current loop is closed via the conducting diode D2.

Figure 5:
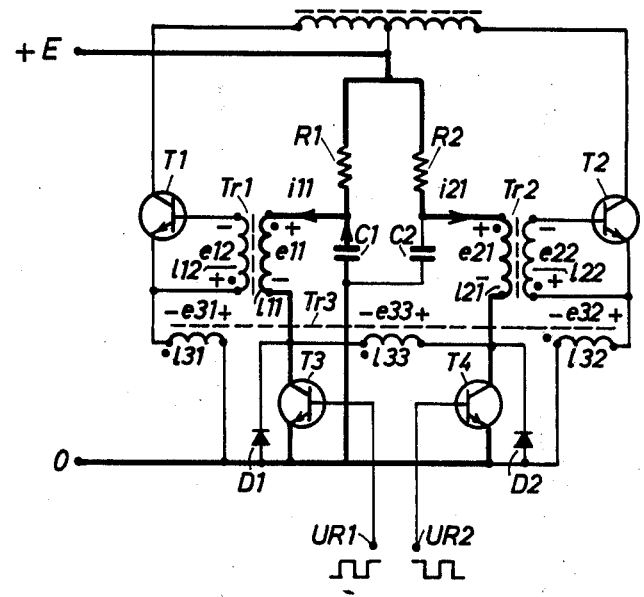

Interval $t3-t4$ (FIG. 5)

At the time $t3$, the control pulse UR2 is still high and the control pulse UR1 becomes high. Consequently, the two drive transistors T3 and T4 both become conducting and current $i11$, $i21$ to the drive transistors T3 and T3 will flow from the terminal +E of the battery to its terminal O. At the same time, the capacitor C1 charged from the previous time interval is discharged. The polarity of the voltage $e11$ will be reversed since the transformer Tr1 is magnetized with a current of opposite polarity relatively the current which magnetized the transformer during the time interval $t2-t3$. The base voltage to the power transistor T1 consequently, becomes negative and endeavours to block this transistor. Furthermore, the power transistor T2 is kept blocked due to the negative base voltage.

Figure 6:
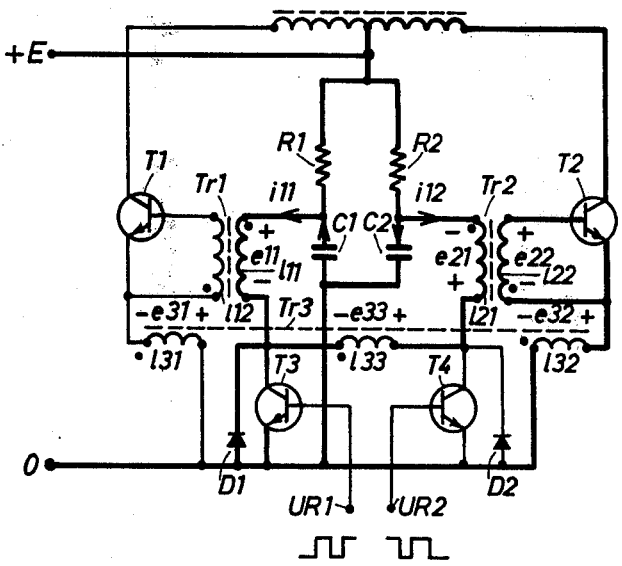

Interval $t4-t5$ (FIG. 6)

At the time $t4$, the control pulse UR2 ceases and the drive transistor T4 is blocked while the drive transistor T1 is conducting. The voltage $e11$ across the winding 111 has unchanged polarity while the polarity of the voltage $e21$ across the winding 121 is reversed and the power transistor T1 is blocked as its base voltage is negative. The capacitor C1 which was charged during the interval $t2-t3$ and started to be discharged during the interval $t3-t4$, continues to discharge also during the interval $t4-t5$ and gives a discharge current which is added to the current $i11$.

A certain energy was stored in the transformer Tr2 during the interval $t3-t4$ (when the transistor T4 was conducting). When the transistor T4 at the time $t4$ is blocked, and emf $e21$ is induced in the winding 121, the polarity of which appears from FIG. 6. This gives a load current 121 according to FIG. 6 which charges the capacitor C2 via the diode D1 now conducting, c.f. the charging of the capacitor C1 during the interval $t2-t3$ above. The charging of the capacitor C2 continues as long as the transistor T4 is blocked. In the secondary winding 122 of the transformer Tr2 an emf $e22$ with the polarity indicated in FIG. 6 is induced at the time $t4$ which gives a positive base voltage to the power transistor T2 so that this becomes conducting.

At the time $t5$ the capacitor C1 is thus practically discharged and the capacitor C2 is charged. Furthermore, the drive transistor T3 and T4 is conducting and blocked respectively, and the belonging power transistor T1 and T2 is blocked and conducting, respectively. It appears from FIG. 2 that the conditions are the same at the time $t5$ as at the time $t1$ and the process will be repeated as described above.

At the start of the converter and before this operates with full pulse width control as above described, there is a risk that the power transistors T1 and T2 both conduct at the same time since the duty cycle of the control pulses UR1 and UR2 mainly is 1:1. The condition that the power transistors will not conduct at the same time during the starting process of the converter is that the current which is caused by the energy stored in the drive transformers is much less than the current from the transformer winding 133 when the diode D1 or D2 conducts. Since the magnetizing current to the transformers Tr1, Tr2 partly is determined by the discharge current from the capacitor C1 and C2, respectively, this current, i.e. the stored energy, can be reduced by inserting a charge limiting circuit for the capacitors. Such a circuit is shown in FIG. 7 and consists of a zener diode Dz, the cathode of which via the diodes D5 and D6 is connected to one of the plates of the capacitors C1 and C2, respectively, and the anode of which via the diodes D7 and D8 is connected to the other plate of the respective capacitor. When, for example, the capacitor C1 has been charged to a certain voltage value the zener diode Dz becomes conducting in its reverse direction and thereby limits the voltage drop across the capacitor C1 to a certain value. This is indicated in FIG. 2e with broken lines and it appears from this Figure that the capacitor C1 is discharged during the time interval $t3-t5$ from a lower initial value than in the case when no limiting circuit is present. In FIG. 7 is also shown a measuring resistor Rm for measuring the emitter currents through the power transistors T1 and T2. When, for example, the power transistor T1 conducts (time interval $t2-t3$, c.f. FIG. 4) the current generated by the winding 133 is proportional to the emitter current of the transistor. The current is conducted from the capacitor C1 through the diode D7, the resistor Rm, the diode D2 and via the windings 133, 111 back to the capacitor C1. The diode D10 shunts at the same time the discharge current from the capacitor C2 through the conducting transistor T4 and the winding 121 as this current is of no importance during the measuring.

FIG. 8 shows a block diagram of the pulse control circuit PR according to FIG. 1. A sawtooth generator SG generates a saw tooth voltage and is connected to the bistable flip-flop BV to trigger this at each falling flank of the saw tooth voltage. The flip-flop BV has an inverting and a non-inverting output $\bar{Q}$ and Q, respectively, each being connected to one of the inputs of the two AND-gates 01, 02, the outputs of which are inverted. An opto-electrical converter OP receives the light signals sent from the unit JF according to FIG. 1 and converts these to a current I, the value of which varies from a low level at a great error signal to a high level at zero error signal in the comparator unit JF. The converter OP is connected to one of the inputs of an adder circuit AD, the second input of which is connected to the saw tooth generator SG. The sawtooth voltage appears unchanged across the output V2, but with a level which depends on the magnitude of the error signal. The block PG indicates a pulse generator which generates a pulse train in which the pulses have a rising flank which corresponds in time with the fall flank of the sawtooth voltage, but where the width of each pulse is determined by the time during which the saw tooth voltage exceeds a certain level determined by the pulse generator. The pulse train thus obtained is fed via the output V3 to the two other inputs of the AND-gate 01 and 02. The control voltage pulses UR1 and UR2 to the drive transistors T3 and T4 are obtained across the two outputs of the gates.

FIG. 9 shows the level of the sawtooth voltage and the pulses obtained during the start of the converter when a great error signal is generated in the comparator unit JF. It appears that the sawtooth voltage is situated below the level defined by the pulse generator PG and across the output V3 a constant voltage level is obtained which makes the two AND-gates 01 and 02 conducting. The control voltage pulses UR1 and UR2 are constituted by the pulses which are delivered from the bistable flip-flop BV with the duty cycle equal to 1:1.

When initiating the control of the converter, i.e. when its output voltage starts increasing, the error signal from the comparator unit JF is reduced so that the level of the sawtooth voltage increases and exceeds the reference level. FIG. 10 shows the case when the level of the sawtooth voltage is so high so that its average value coincides with the reference level. A symmetrical pulse train is obtained across the output V3, the frequency of which is equal to the frequency of the sawtooth voltage. In this manner the obtained control voltage pulses UR1 and UR2 will get a duty cycle $\neq$ 1, c.f. FIGS. 2a–2b.

The drive circuit according to the invention is not limited to a converter containing two power transistors. The drive circuit may, for example, also be used in a DC-converter with four power transistors in a bridge connection. Each drive transformer Tr1 and Tr2 must then be completed with an additional secondary winding except the windings 112 and 122, respectively, shown in FIG. 1. Each of the two further windings is then connected to the base emitter circuits of the power transistors which have been added. To share the base currents equal to the four power transistors, a resistor is suitably connected in the base emitter circuit of each transistor. The remaining part of the circuit is the same as in FIG. 1.

We claim:

1. Power transistor drive apparatus in a DC-converter, said converter having first and second terminals for respective connection to the terminals of a DC supply voltage, a main transformer means, rectifying means and filtering means, said power transistors being alternately conducting and each having a main current circuit connected to said main transformer means and a control current circuit, comprising a first and a second drive transistor, a first and a second drive transformer each consisting of a primary winding connected to one of said terminals via one of said drive transistors and at least one secondary winding connected to the control current circuit of said power transistors, a further transformer consisting of a first and a second winding connected to said main current circuit of each of the power transistors, an a third winding connected to one of the primary windings of said first and second drive transformers for transferring, via said first winding and one of said drive transformers, a current proportional to the current through the main current circuit of one of said power transistors to the control circuit of the same transistor and, at the same time, for creating a voltage drop across said secondary winding which counteracts conducting of the non-conducting power transistor, and a first and a second capacitor connected to the primary winding of said first and second drive transformer and to one of said terminals, said capacitors each being charged via the third winding of said further transformer when the associated power transistor is conducting and being discharged when the same transistor is non-conducting, whereby the capacitor voltage provides further blocking of the transistor.

2. Apparatus as claimed in claim 1, wherein said drive transformers each consists of a primary winding and a secondary winding for the control of two power transistors in the converter.

3. Apparatus as claimed in claim 1, wherein the winding ratio of said drive transformers mainly is equal and that the winding ratio between the first or the second and the third winding of said further transformer is chosen so that the ratio between the winding ratio of the further transformer and the winding ratio of one of the drive transformers is mainly equal to the current amplification factor of the power transistors.

4. Apparatus as claimed in claim 1, wherein a charge limiting circuit is provided which limits the voltage across each of said capacitors during charging to prevent simultaneous conducting of said power transistors.

* * * * *